(12) United States Patent
Khan

(10) Patent No.: US 11,918,157 B2
(45) Date of Patent: Mar. 5, 2024

(54) HAND SANITIZING COMPLIANCE SYSTEM

(71) Applicant: Beatriz Khan, Tallahassee, FL (US)

(72) Inventor: Beatriz Khan, Tallahassee, FL (US)

( * ) Notice: Subject to any disclaimer, the term of this patent is extended or adjusted under 35 U.S.C. 154(b) by 218 days.

(21) Appl. No.: 17/068,405

(22) Filed: Oct. 12, 2020

(65) Prior Publication Data
US 2022/0015584 A1  Jan. 20, 2022

Related U.S. Application Data

(60) Provisional application No. 63/051,622, filed on Jul. 14, 2020.

(51) Int. Cl.
*A47K 5/12* (2006.01)
*G06K 7/14* (2006.01)

(52) U.S. Cl.
CPC .......... *A47K 5/1217* (2013.01); *G06K 7/1413* (2013.01); *G06K 7/1417* (2013.01)

(58) Field of Classification Search
CPC ... A47K 5/1217; G06K 7/1413; G06K 7/1417
See application file for complete search history.

(56) References Cited

U.S. PATENT DOCUMENTS

2010/0117836 A1 * 5/2010 Seyed Momen ...... G16H 40/20
340/573.1

* cited by examiner

*Primary Examiner* — Matthew Mikels
(74) *Attorney, Agent, or Firm* — The Rapacke Law Goup, P.A.; Andrew S. Rapacke (57) ABSTRACT

An electronic dispensing system for promoting effective use of a hand cleanser includes a dispensing device and a remote software. The dispensing device senses and records human activity over periods of time before and after dispensing an amount of cleanser, prompts human participation, and reports performance for remote display. One or more sensors detect human presence within a perimeter around the dispensing device and within an immediate area nearer the device. A trigger sensor detects the presence of a hand below a dispensing mechanism, and an electronic controller dispenses an amount of cleanser and starts a timer and an alert system that issues prompts, including a timer display, light, other visual display, speaker, or vibrating alert. An ID reader may read user identification codes. Settings and performance may be paired with a specific user. Sensors of multiple dispensing devices may work together as an array for more accurate sensing.

17 Claims, 5 Drawing Sheets

HAND SANITIZING COMPLIANCE SYSTEM

RELATED APPLICATIONS

This application claims the benefit of U.S. Provisional Patent Application No. 63/051,622 filed on Jul. 14, 2020, entitled "Hand Sanitizer and Hand Soap Compliance System," which is incorporated by reference herein.

TECHNICAL FIELD

The embodiments generally relate to hand hygiene and, more specifically, to systems, methods, and devices for dispensing hand sanitizer and hand soap.

BACKGROUND

Hygiene is critical in preventing the spread of infections, germs, and diseases, especially in a public setting such as a hospital, grocery store, and department stores. Approximately 1 in 10 people admitted to hospitals acquire a new infection during a hospital stay, resulting in up to 100,000 deaths each year. Respiratory diseases are known for their propensity to spread in public areas, which unlike hospitals have no sanitation protocols, resulting in the rampant spread of infection.

There is considerable evidence that hand hygiene compliance is a primary means to reduce infections and the transmission of pathogens. Proper handwashing techniques are important and may be supplemented with hand sanitizer when hand washing is inconvenient or unavailable.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

An electronic dispensing system for promoting effective use of a hand cleanser generally includes a dispensing device and a remote software to which the dispensing device transmits data that is made available for display on remote devices.

An electronic dispensing device generally includes an electronic controller having a memory and at least one timing function, a control interface in communication with the electronic controller, a housing having a reservoir configured to hold a cleanser and a dispensing mechanism having an outlet that dispenses the cleanser from the reservoir and out of the housing, a first sensor that detects entrance of a human within a perimeter around the dispensing device and communicates this entrance to the electronic controller, a trigger sensor that detects the presence of an object in close proximity below the outlet and communicates this presence to the electronic controller to activate the dispensing mechanism to dispense an amount of cleanser and start a cleansing timer, and an alert system comprising a timer display, light, other visual display, speaker, vibrating alert, or a combination thereof through which the electronic controller issues prompts to the human present. The dispensing device senses and records human activity over periods of time before and after dispensing the amount of cleanser, prompts human participation, and reports performance for remote display.

The electronic dispensing system and the electronic dispensing device comprise a plurality of settings for the first sensor, trigger sensor, timing functions, amount of cleanser dispensed, cleanser fill volume, alert system prompts, or a combination thereof. Presets may be set for both the amount of hand soap and the amount of hand sanitizer to be dispensed. The controller or remote software may allow settings to be paired with specific users.

The dispensing system or the dispensing device may comprise an ID reader that reads user identification codes and pair performance with a specific user. A sensor may communicate with the electronic controller to time the duration between the dispensing of the amount of cleanser and the time when the human leaves the immediate area of the dispensing device, or the first sensor may also perform that function. Each sensor is configured to perform more than one function, and they may be infrared sensors.

In one embodiment, multiple dispensing devices are in communication with the remote software, and the first sensors of the multiple dispensing devices comprise an array that works together for more accurate sensing.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

A more complete understanding of these embodiments, and the attendant advantages and features thereof, will be more readily understood by reference to the following detailed description when considered in conjunction with the accompanying drawings. The drawings described herein may not be to scale, are for illustrative purposes only of selected embodiments and not all possible implementations, and are not intended to limit the scope of the present disclosure.

For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

Corresponding reference numerals indicate corresponding parts throughout.

DETAILED DESCRIPTION

The specific details of the single embodiment or variety of embodiments described herein are to the described system. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

The smart system of the present Application actively engages users during a hand cleansing session to continue cleansing for the recommended length of time. Time is a key determinant to the level of sanitation achieved. Regular use of this dispensing and compliance system will modify behavior to generate sustainable improvements in hand cleansing. Both businesses and consumers will benefit from data that shows real-time performance, which is an indication of health and safety.

As shown in FIGS. 1-7, an electronic dispensing system 100 for promoting compliance of use of a hand cleanser comprises an app, SaaS, online or cloud-based program, or remote software 102 and at least one dispensing device 110. The electronic dispensing system 100 may comprise multiple dispensing devices 110 in one or multiple locations. Remote software 102 may be used to program the dispensing device 110 and/or receive transmissions from the dispensing device 110 in order to produce a performance display 105 viewable on other devices in remote locations.

The dispensing device 110 generally has an interior defined by a front housing 111 and a rear housing 112, and the dispensing device may have a bottom housing 113 and top housing 114, though the relationship among those parts may vary based upon the curvature of the sides and other aspects of various embodiments. The dispensing device 110 in FIG. 2-5 is designed to be mounted through the housing back 119 on a wall or stand, and the front housing 111 and rear housing 112 are joined at a hinge. The dispensing device 110 in FIG. 6-7 (bottom cover not shown) is designed to be stand-alone or mounted on a stand, and its top housing 114 is a refill cover. Units are designed to be water-resistant, and preferably water-proof. A QR code 115 or similar ID code 115 on the housing may be used to report problems with the dispensing device 110 and to view data related that that specific dispensing device 110, such as the usage rate of that unit. One of skill in the art will understand that dispensing devices 110 may be designed with a variety of housing configurations that provide appropriate functionality as described below.

Figure 1:
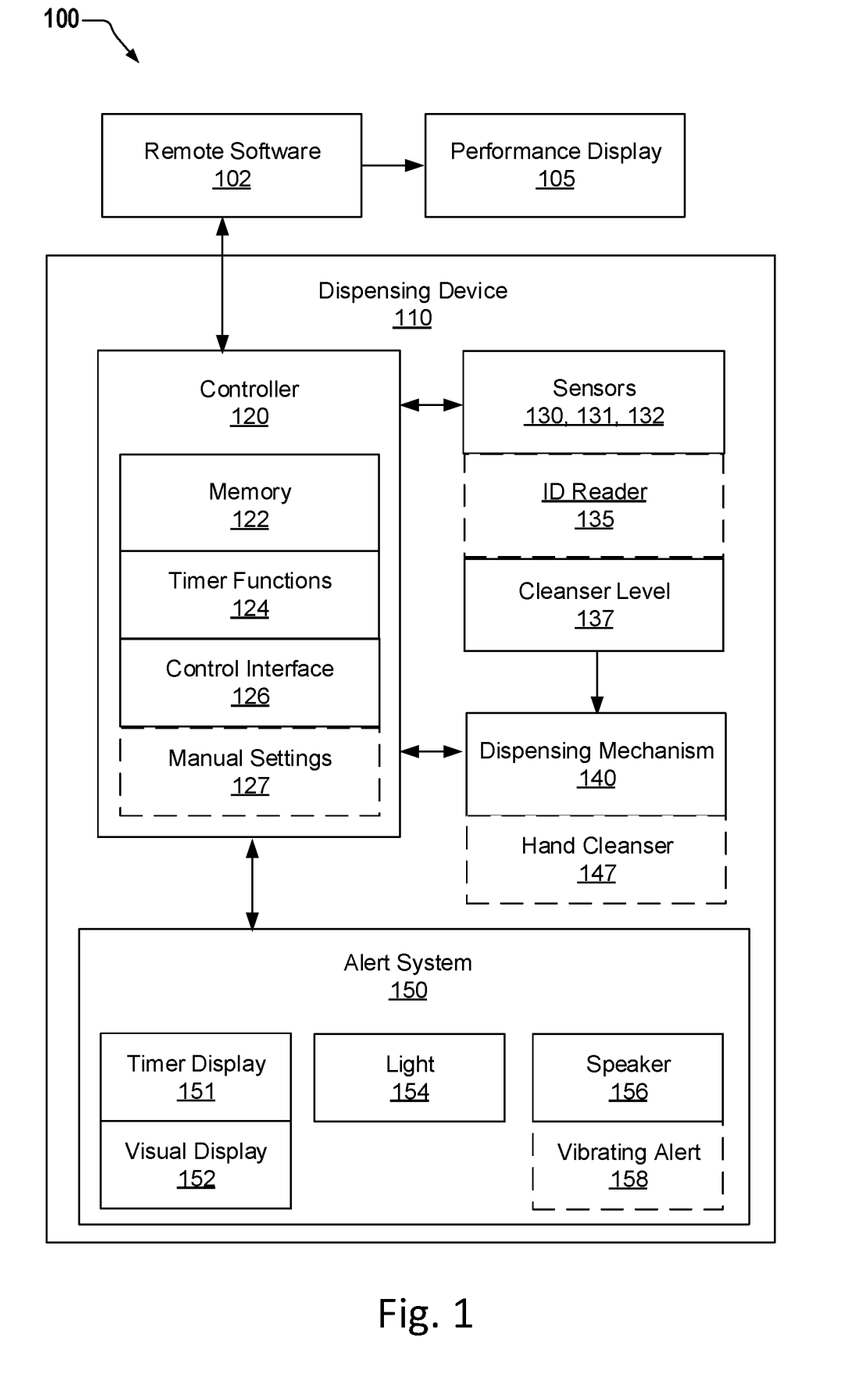
FIG. 1 is a block diagram of a hand sanitizing compliance system.
Figure 2:
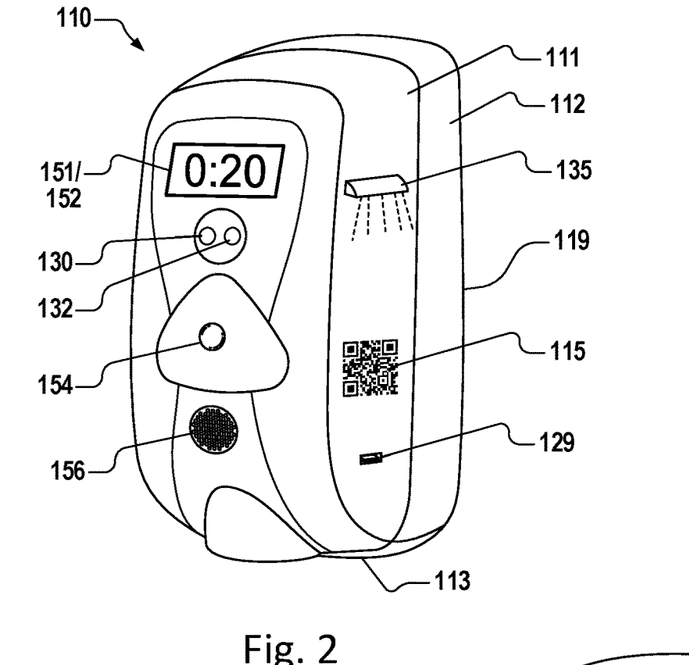
FIG. 2 is a perspective view of a hand cleanser dispensing device.
Figure 3:
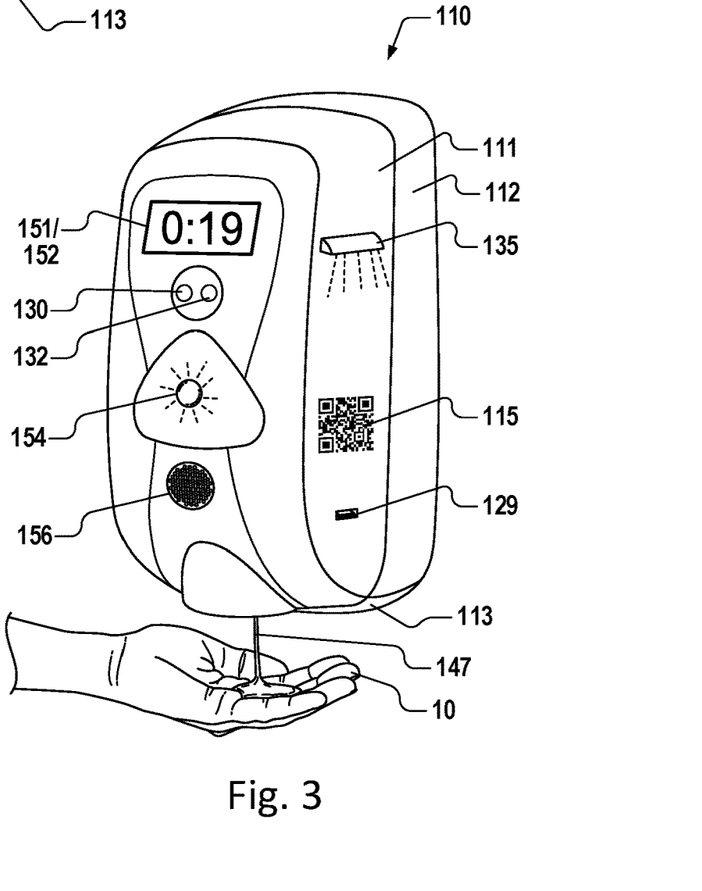
FIG. 3 is the hand cleanser dispensing device of FIG. 2 in use.
Figures 4, 5:
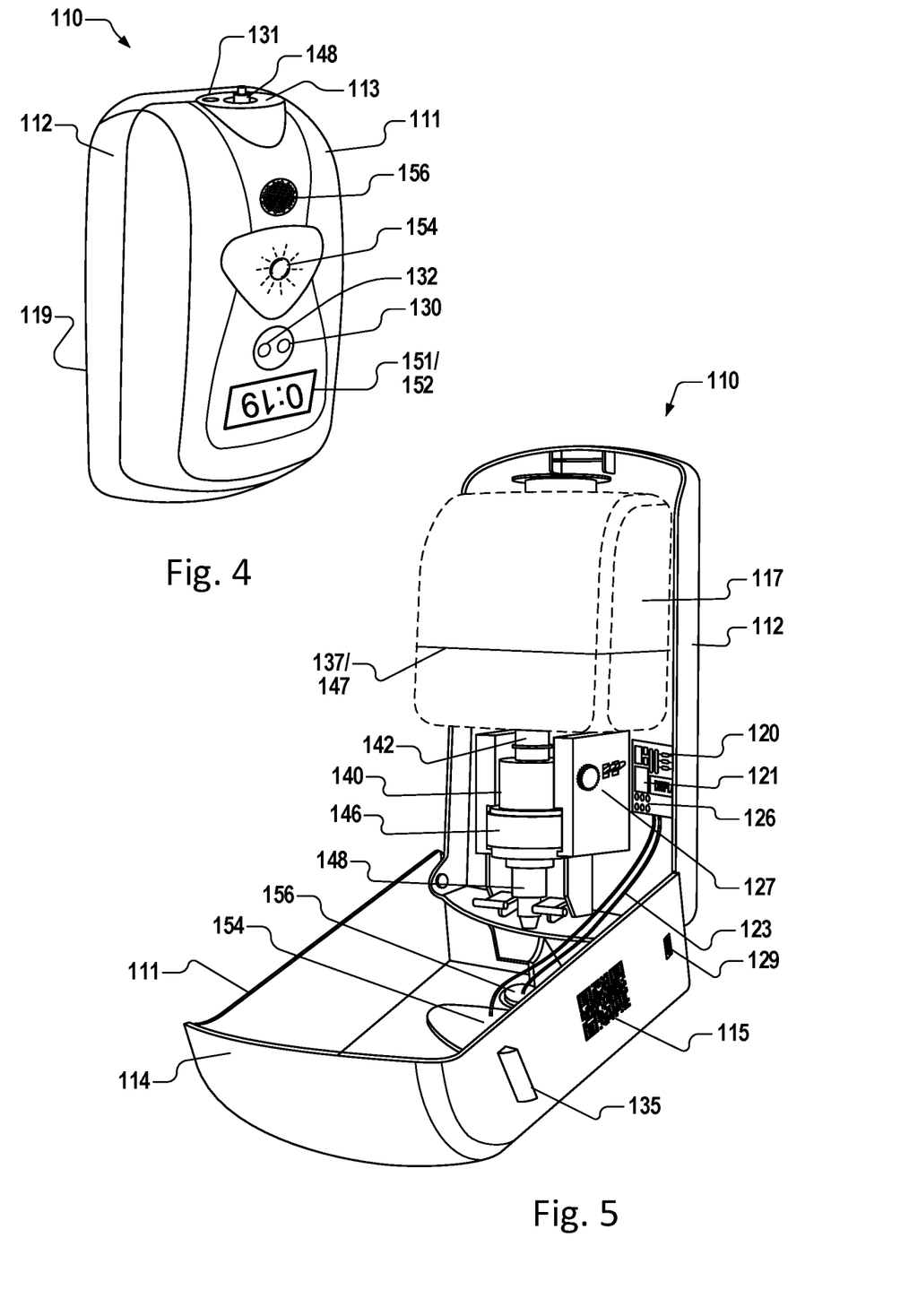
FIG. 4 is a bottom perspective view of the hand cleanser dispensing device of claim 2.
FIG. 5 is a perspective view that illustrates the interior of the hand cleanser dispensing device of claim 2.
Figure 6:
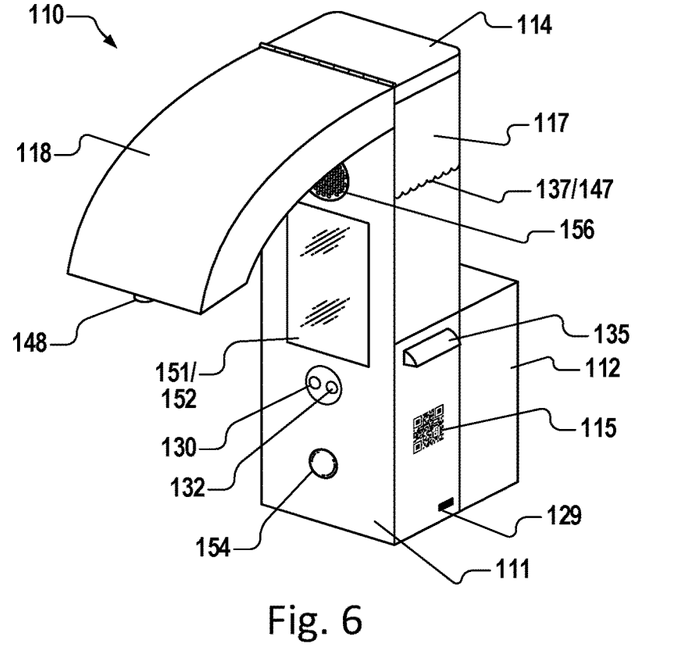
FIG. 6 is a perspective view of a free-standing embodiment of a hand cleanser dispensing device.
Figure 7:
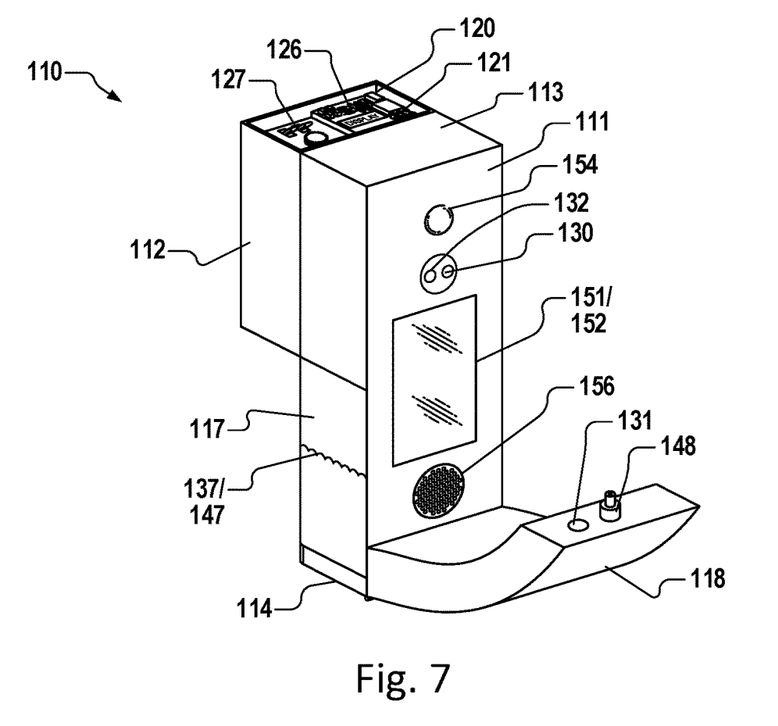
FIG. 7 is a bottom perspective view illustrating the hand cleanser dispensing device of FIG. 6.

Within the housing is a chamber or reservoir 117 that holds hand cleanser 147 and feeds into a dispensing mechanism 140 comprising a cleanser intake 142, motor or pump 146, and nozzle or cleanser outlet 148. The reservoir 117 may be a disposable cartridge for dispensing a hand cleanser 147 that is a hand sanitizing foam, lotion, gel, liquid, semi-liquid, or other form of alcohol-based and non-alcohol-based hand sanitizers known in the arts. Similarly, the reservoir 117 may be used for a hand cleanser 147 that is a soap, detergent, or similar product. Alternatively, the reservoir 117 may be a refillable chamber affixed or integrally molded to the interior of the dispensing device 110. The hand cleanser 147 itself may or may not be included as part of an electronic dispensing kit or its system 100.

The difference in hand soaps and hand sanitizers is that, although both are effective at killing germs, hand sanitizers do not remove dirt from hands as well as soaps. Still, one of skill in the art will understand that numerous terms may be used interchangeably, including, but not limited to "sanitize," "clean," "cleanse," "disinfect," and "sterilize."

Each dispensing device 110 comprises an electronic controller 120 having a memory 122 and one or more timers or timer functions 124. The memory 122 may be configured to store various functional settings including the volume of hand sanitizer 147 sufficient to sanitize a surface, the contact time required for the surface to be sanitized, alert settings, and the like. In a preferred embodiment, the dispensing device 100 and/or remote software 102 possess preset instructions for dispensing a variety of cleansers having different attributes, including presets for both an amount of hand soap to be dispensed and an amount of hand sanitizer to be dispensed, depending upon which cleanser is 147 used. An electronic control interface 126 and control display 121 in operable communication with the electronic controller 120 may be located on the interior or exterior of the housing, with the former being more tamper-resistant. In one configuration the electronic controller 120 monitors the cleanser level 137 or volume to notify maintenance of an approaching outage.

An interface that allows manual settings 127 for some basic adjustment may also be present. For example, if a new soap 147 is thicker than usual, then a lever or dial 127 may be manipulated to allow greater flow when the soap 147 is dispensed. The dispensing device 110 further comprises various wiring 123 and a power connector 129 that transfers power from an internal or external power source to the dispensing device 110. The power connector 129 may be a USB port or AC plug for an external power source. An internal power source may be a rechargeable battery or alkaline battery, in which case the power connector 129 is a battery holder. Other similar power sources are known in the arts.

Each dispensing device 110 also comprises one or more sensors 130, 131, 132 that determine human proximity and activity within a prescribed range of the dispensing device 110, usually by detecting motion. A first sensor 130 is configured to detect the entrance of a human within a perimeter around the dispensing device 110 and communicate this detection or entrance to the electronic controller 120, wherein the electronic controller 120 notes the time of entrance (time stamp) and times the presence of the human within the perimeter (another time stamp), which may involve noting the human re-entering the space from an opposite direction. When multiple dispensing devices 110 are installed in the same space, their sensors may work together as an array for more accurate determination of the number of people present in the space.

A second sensor or trigger sensor 131 is configured to detect the presence of a hand or other object 10 within inches of the cleanser outlet 148 and communicate this detection or presence to the electronic controller 120, wherein the electronic controller 120 notes the time of presence (time stamp), activates the dispensing mechanism 140 to dispense an amount of hand cleanser 147, and starts a cleansing timer function 124 related to the minimum amount of time that hands should be rubbed together to be sanitized based on the type of hand cleanser 147 in use. (In FIG. 4 the trigger sensor 131 and dispenser outlet 148 are shown on the bottom of the housing, whereas in FIG. 7 they are shown on an arm 118 that extends outward from the front housing 111.) The trigger sensor may be a press plate or a sensor type noted in the next paragraph. The amount of hand cleanser 147 dispensed is typically determined by the pump 146 running for a preset length of time.

A third sensor 132 is configured to detect continued motion or activity, as of hands rubbing together, within the immediate area of the dispensing device 110 and communicate this continued activity to the electronic controller 120, wherein the electronic controller 120 simultaneously checks for continued activity and checks to see if the timer function 124 is complete. The time at which the activity is discontinued is noted (a follow-up time stamp), as is re-engagement by the human. The term "immediate area" means a nearer perimeter than that covered by the first sensor 130, such as "within feet of the dispensing device" or a similarly defined proximity. The first sensor 130, trigger sensor 131, and third sensor 132 may be separate sensors, one sensor, one or more dual sensors, or a mix thereof depending on functionality and cost, and the dispensing device 110 is not limited to three sensors. Sensors may be infrared, area reflective, light sensitive, or other known technology that delivers similar performance.

In one embodiment, the dispensing device 110 comprises a bar code scanner, QR code reader, or other ID Reader 135 on its housing to enable the memory 122 to associate or pair the time stamps mentioned above with specific people, whether employees, students, etc. ID may include, but is not limited to, a key card, key fob, smart watch, smart phone, or wristband. Certain IDs may be included in a kit along with the dispensing device 110. Rewards and promotional materials may also be delivered to ID devices such as smart phones. An example of this functionality will be discussed later in this specification.

The dispensing device 110 further comprises an alert system 150 comprising, but not limited to, a timer display 151, other visual display 152, light(s) 154, speaker(s) 156, a vibrating alert 158, or a combination thereof that delivers prompts and a "user experience." Less expensive models may contain fewer alert components or come with a limited number of preset alerts. In a preferred embodiment, the alert system 150 is customizable with overlapping functionality among the alert components. For example, hand cleansing time may be "counted down" using a timer display 151, or a light show 154 with music 156, or a video 152 that provides news updates or sports highlights. Other examples of user experiences are trivia questions, jokes, animated characters and voices, a movie trailer, or even silent mode. Examples of alerts used for correction or to reward a user include a red light, the answer to a trivia question, the punchline of a joke, silent mode, or other prompts such as "You're all done" or "You're not quite done." The alert system 150 may be programmed via the control interface 126 or alternately via the remote software 102.

Figure 8:
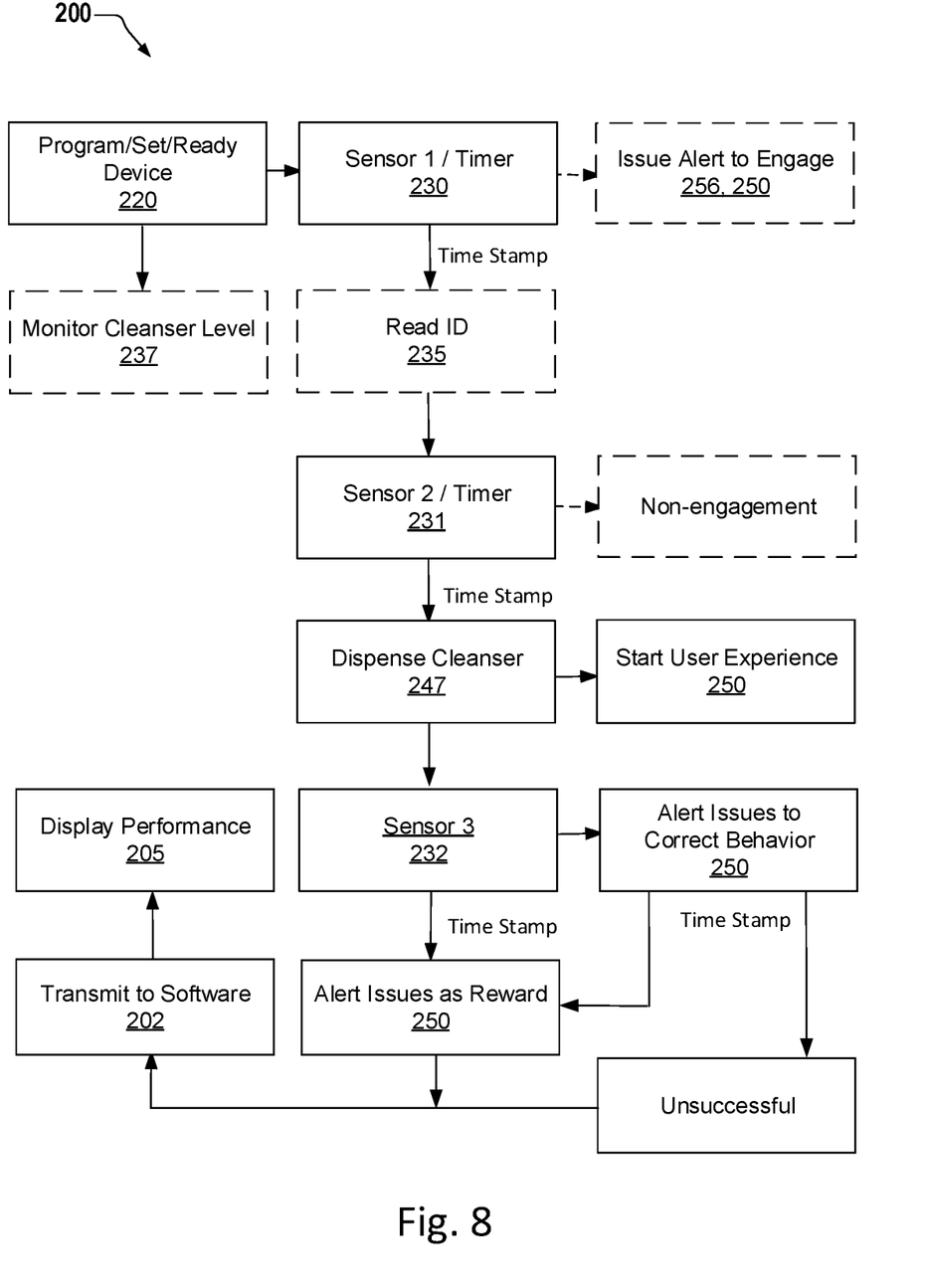
FIG. 8 is a block diagram of a hand sanitizing compliance method.

Turning to FIG. 8, an electronic dispensing method 200 for promoting compliance of use of a hand cleanser begins with a maintenance user placing the unit and adjusting settings as needed 220. The unit regularly monitors the hand cleanser level 237. When a target user enters a set area or perimeter, the first sensor starts a timer 230 and a time stamp and optionally issues an alert 256, 250 to the user to clean their hands 10. Optionally, the target user places an ID in position for the dispensing device 110 to read their ID 235. The second sensor waits to be triggered. If a set amount of time passes without sensing an object, the system records a "non-engagement." If an object engages the second sensor, then the electronic controller 120 starts a timer 231 and a time stamp, dispenses an amount of hand cleanser 247, and begins a user experience 250 in order to maintain user performance for the duration of the timer. The third sensor detects ongoing activity 232 as a measure of user performance. If the user rubs the cleanser on their hands for the duration of the timer, completion is time stamped and the alert system issues a reward 250. If the user fails to rub the cleanser on their hands for a sufficient duration, the alert system issues a corrective alert 250 or prompt to influence the user's behavior. Successful and unsuccessful interactions are recorded and transmitted to the remote software 202 and made available to display the performance 205 of target users at that particular dispensing device 110. The remote software 102 may correct for false non-engagements and other data related to traffic volume through an area around a dispensing device 110. Performance data may be displayed 205 as a rating related to successful hand sanitization. Users, maintenance workers, managers of organizations, potential users (potential customers) and the general public may view data on the performance display 105 based on account permissions.

Example of Use: Highway Rest Area

A busy rest stop has ten dispensing devices 110 installed at ten sinks in the customer restroom, thereby creating a sensor array for more accurately detecting the number of humans present, and one dispensing device 110 over the sink of the employee restroom. The rest stop also has twenty gas pump stations with one wall-mounted dispensing device 110 at each pump. All devices 110 are registered through the remote software 102 to the rest stop as a public business account.

In the customer restroom, Customer A approaches a sink and activates a trigger sensor 131 of a dispensing device 110 by placing a hand 10 below the trigger sensor 131. Controller 120 activates a visual digital timer 151 that begins a 20-second countdown and a video advertisement 152 for products sold in the rest stop store. The third (motion) sensor 132 detects continuous movement within a few feet of the dispensing device 110 as Customer A scrubs her hands for the duration of the timer's countdown and video advertisement. Alert system 150 rewards Customer A with a recording 250 (programmed by the rest stop) that says, "Thanks for stopping in!" Customer A rinses her hands and walks away. This engagement is recorded and transmitted in real-time 202 as a successful hand sanitation session.

In the private employee restroom, the first sensor 130 of the dispensing device 110 detects motion more than several feet away as Employee X enters. Then the first sensor 130 detects motion a second time, and the trigger sensor 131 fails to be activated shortly thereafter as Employee X walks out of the restroom. This event is logged as a non-engagement.

Outside at a gas station pump, Customer B returns the gas nozzle to the pump and activates a dispensing device 110 holding hand sanitizer 147 by placing a hand 10 within inches of the trigger sensor 131. The alert system activates 250 with a visual digital timer 151 having a 30-second second countdown and an animated magician character on the screen 152 and prompts the user by saying, "Scrub your hands for 30 seconds for a magical discount" 156. Third motion sensor 132 detects continuous movement within a few feet as Customer B scrubs his hands for the duration of the timer's countdown. Alert system 150 rewards 250 Customer B with a recording that says, "You did it! Scan your QR Code to get your coupon. First time user? Download our app to get your code. Thanks for stopping in!" This engagement is recorded and transmitted 202 in real-time as a successful hand sanitation session. Customer B scans his QR Code using the ID reader 135, and a rest stop coupon is stored in the remote software 102.

Back in the private employee restroom, the dispensing device 110 detects motion beyond several feet of the first sensor 130 as Employee Y enters. Then the first sensor 130 detects motion a second time, and shortly thereafter Employee Y scans an employee ID with the hands-free ID reader 135 and places a hand 10 below the trigger sensor 131. A visual digital timer 151 begins to count down 20 seconds, and a green light 154 flashes. The third sensor 132 detects continuous movement for 9 seconds followed by no motion at all for longer than 10 seconds. This event is logged as an unsuccessful hand sanitation session assigned to Employee Y with a timestamp.

The rest stop's facility manager utilizes the data collected by the remote software 102 to learn how much cleanser 147 is available in all registered devices at the rest stop, sees trends in performance 105, and determines to program the controller 120 to alert employees to correct their behavior 250 by washing their hands longer.

Meanwhile, potential Customer C is a passenger in a vehicle looking for an upcoming rest stop that is clean and safe. Customer C locates the rest stop in the remote software 102 and reviews the rest stop's hand cleansing performance 105. Based on overall performance, potential Customer C makes a decision whether or not to give the rest stop her business.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. An electronic dispensing system for promoting effective use of a hand cleanser, the dispensing system comprising:
    (a) at least one dispensing device comprising:
        (i) an electronic controller having at least one timing function;
        (ii) a control interface in communication with the electronic controller;
        (iii) a housing having a reservoir configured to hold a cleanser and a dispensing mechanism having an outlet that dispenses the cleanser from the reservoir and out of the housing;
        (iv) a first sensor that detects entrance of a human within a perimeter around the dispensing device and communicates this entrance to the electronic controller;
        (v) a trigger sensor that detects the presence of an object in close proximity below the outlet and communicates this presence to the electronic controller, wherein the electronic controller activates the dispensing mechanism to dispense an amount of cleanser and starts a cleansing timer; and
        (vi) an alert system comprising a timer display, light, other visual display, speaker, vibrating alert, or a combination thereof through which the electronic controller issues prompts to the human present; and
    (b) a remote software to which the at least one dispensing device transmits data that is made available for display on remote devices,
        wherein the at least one dispensing device is configured to:
            sense and record human activity over periods of time before and after dispensing the amount of cleanser;
            prompt human participation; and
            report performance for remote display,
        wherein:
            the remote software is connected to an ID reader configured to read user identification codes and record user performance; and
            the first sensor is configured to communicate with the electronic controller to time the duration between the dispensing of the amount of cleanser and the time when the human leaves the immediate area of the dispensing device.

2. The dispensing system of claim 1, further comprising a third sensor that communicates with the electronic controller to time the duration between the dispensing of the amount of cleanser and the time when the human leaves the immediate area of the dispensing device.

3. The dispensing system of claim 1, wherein the first sensor or trigger sensor performs more than one sensor function.

4. The dispensing system of claim 1, wherein the first sensor or trigger sensor is an infrared sensor.

5. The dispensing system of claim 1, comprising multiple dispensing devices in communication with the remote software.

6. The dispensing system of claim 5, wherein the first sensors of the multiple dispensing devices comprise an array of sensors.

7. The dispensing system of claim 1, further comprising settings for the first sensor, trigger sensor, timing functions, amount of cleanser dispensed, cleanser fill volume, alert system prompts, or a combination thereof.

8. The dispensing system of claim 7, further comprising presets for both the amount of hand soap and the amount of hand sanitizer to be dispensed.

9. The dispensing system of claim 7, wherein the controller or remote software allows settings to be paired with specific users.

10. An electronic dispensing system for promoting effective of use of a hand cleanser, the dispensing system comprising:
(a) at least one dispensing device comprising:
  (i) an electronic controller having a memory and at least one timing function;
  (ii) a control interface in communication with the electronic controller;
  (iii) presets for both the amount of hand soap and the amount of hand sanitizer to be dispensed and adjustable settings for sensors, timing functions, measure of cleanser dispensed, cleanser fill volume, alert system prompts, or a combination thereof;
  (iv) a housing having a reservoir configured to hold a cleanser and a dispensing mechanism having an outlet that dispenses the cleanser from the reservoir and out of the housing;
  (v) a first sensor that detects entrance of a human within a perimeter around the dispensing device and communicates this entrance to the electronic controller;
  (vi) a trigger sensor that detects the presence of an object in close proximity below the outlet and communicates this presence to the electronic controller, wherein the electronic controller activates the dispensing mechanism to dispense an amount of cleanser and starts a cleansing timer;
  (vii) an ID reader that reads user identification codes, wherein performance is recorded for a specific user; and
  (viii) an alert system comprising a timer display, light, other visual display, speaker, vibrating alert, or a combination thereof through which the electronic controller issues prompts to the human present; and
(b) a remote software to which the at least one dispensing device transmits data that is made available for display on remote devices,
  wherein the at least one dispensing device is configured to:
    sense and record human activity over periods of time before and after dispensing the amount of cleanser;
    prompt human participation; and
    report performance for remote display;
  and
  wherein the memory or remote software allows settings to be paired with a specific user,
  wherein:
    the remote software is connected to an ID reader configured to read user identification codes and record user performance; and
    the first sensor is configured to communicate with the electronic controller to time the duration between the dispensing of the amount of cleanser and the time when the human leaves the immediate area of the dispensing device.

11. The dispensing system of claim 10, further comprising a third sensor that communicates with the electronic controller to time the duration between the dispensing of the amount of cleanser and the time when the human leaves the immediate area of the dispensing device.

12. The dispensing system of claim 10, wherein the first sensor or trigger sensor performs more than one sensing function.

13. The dispensing system of claim 10, comprising multiple dispensing devices in communication with the remote software.

14. An electronic dispensing device for promoting effective of use of a hand cleanser, the dispensing device comprising:
(a) an electronic controller having a memory and at least one timing function;
(b) a control interface in communication with the electronic controller;
(c) presets for both the amount of hand soap and the amount of hand sanitizer to be dispensed and adjustable settings for sensors, timing functions, measure of cleanser dispensed, cleanser fill volume, alert system prompts, or a combination thereof;
(d) a housing having a reservoir configured to hold a cleanser and a dispensing mechanism having an outlet that dispenses the cleanser from the reservoir and out of the housing;
(e) a first sensor that detects entrance of a human within a perimeter around the dispensing device and communicates this entrance to the electronic controller;
(f) a trigger sensor that detects the presence of an object in close proximity below the outlet and communicates this presence to the electronic controller, wherein the electronic controller activates the dispensing mechanism to dispense an amount of cleanser and starts a cleansing timer;
(g) an ID reader that reads user identification codes, wherein performance is recorded for a specific user; and
(h) an alert system comprising a timer display, light, other visual display, speaker, vibrating alert, or a combination thereof through which the electronic controller issues prompts to the human present,
wherein the dispensing device is configured to:
  transmit data to a remote software;
  senses and records human activity over periods of time before and after dispensing the amount of cleanser;
  prompt human participation; and
  report performance to the remote software; and
wherein the memory allows settings to be paired with a specific user,
wherein:
  the remote software is connected to an ID reader configured to read user identification codes and record user performance; and
  the first sensor is configured to communicate with the electronic controller to time the duration between the dispensing of the amount of cleanser and the time when the human leaves the immediate area of the dispensing device.

15. The dispensing device of claim 14, wherein the first sensor communicates with the electronic controller to time the duration between the dispensing of the amount of cleanser and the time when the human leaves the immediate area of the dispensing device.

16. The dispensing device of claim 14, further comprising a third sensor that communicates with the electronic controller to time the duration between the dispensing of the amount of cleanser and the time when the human leaves the immediate area of the dispensing device.

17. The dispensing device of claim 14, wherein the first sensor or trigger sensor performs more than one sensing function.

\* \* \* \* \*